United States Patent
Itano et al.

(10) Patent No.: US 12,319,864 B2
(45) Date of Patent: *Jun. 3, 2025

(54) COMPOSITION INCLUDING REFRIGERANT, USE THEREFOR, REFRIGERATOR COMPRISING SAME, AND METHOD FOR OPERATING SAID REFRIGERATOR

(71) Applicant: DAIKIN INDUSTRIES, LTD., Osaka (JP)

(72) Inventors: Mitsushi Itano, Osaka (JP); Shun Ohkubo, Osaka (JP); Daisuke Karube, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 674 days.

This patent is subject to a terminal disclaimer.

(21) Appl. No.: 17/553,045

(22) Filed: Dec. 16, 2021

(65) Prior Publication Data

US 2022/0106512 A1 Apr. 7, 2022

Related U.S. Application Data

(63) Continuation of application No. PCT/JP2020/024172, filed on Jun. 19, 2020.

(30) Foreign Application Priority Data

Jun. 19, 2019 (JP) ................................ 2019-114160
Apr. 17, 2020 (JP) ................................ 2020-073959

(51) Int. Cl.
*C09K 5/04* (2006.01)
*F25B 13/00* (2006.01)

(52) U.S. Cl.
CPC .............. *C09K 5/045* (2013.01); *F25B 13/00* (2013.01); *C09K 2205/126* (2013.01)

(58) Field of Classification Search
CPC .............. C09K 5/045; C09K 2205/126; C09K 2205/22; C09K 2205/40; F25B 13/00; F25B 41/40
See application file for complete search history.

(56) References Cited

U.S. PATENT DOCUMENTS

2011/0253927 A1* 10/2011 Minor ..................... F25B 45/00
252/182.29
2011/0253972 A1 10/2011 Xiong et al.
(Continued)

FOREIGN PATENT DOCUMENTS

| CN | 103547652 | 1/2014 |
| JP | 2012-526182 | 10/2012 |

(Continued)

OTHER PUBLICATIONS

Extended European Search Report issued Jun. 15, 2023 in corresponding European Patent Application No. 20827768.1.
(Continued)

*Primary Examiner* — Andrew J. Oyer
(74) *Attorney, Agent, or Firm* — Wenderoth, Lind & Ponack, L.L.P.

(57) ABSTRACT

An object is to provide a novel low-GWP mixed refrigerant. A solution to the problem is to provide a composition containing a refrigerant that contains trans-1,2-difluoroethylene (HFO-1132(E)) and 1,3,3,3-tetrafluoropropene (R1234ze).

21 Claims, 1 Drawing Sheet

(56) References Cited

U.S. PATENT DOCUMENTS

| | | | | |
|---|---|---|---|---|
| 2014/0077123 A1* | 3/2014 | Fukushima | ............ | C09K 5/044 |
| | | | | 570/136 |
| 2017/0002245 A1 | 1/2017 | Fukushima | | |
| 2017/0058173 A1* | 3/2017 | Fukushima | ............ | C09K 5/045 |
| 2017/0174967 A1 | 6/2017 | Itano et al. | | |

FOREIGN PATENT DOCUMENTS

| JP | 2013-529703 | 7/2013 |
|---|---|---|
| JP | 2015-511262 | 4/2015 |
| JP | 2016-156001 | 9/2016 |
| WO | 2005/105947 | 11/2005 |
| WO | 2010/129920 | 11/2010 |
| WO | 2011/163117 | 12/2011 |
| WO | 2013/122892 | 8/2013 |
| WO | 2015/141678 | 9/2015 |
| WO | 2015/186557 | 12/2015 |
| WO | 2019/021726 | 1/2019 |

OTHER PUBLICATIONS

International Preliminary Report on Patentability issued Dec. 21, 2021 in International (PCT) Patent Application No. PCT/JP2020/024172.

International Search Report issued Sep. 15, 2020 in International (PCT) Application No. PCT/JP2020/024172.

"Proceedings of the Academic Conference on Engineering Therics and Energy Uti", Chinese Society of Engineering Thermophysics, Nanjing 2000, pp. 456-461, with English machine translation.

Pengju, Bie et al., "The Alternative Technologies' Options and Policy Proposals for Phasing out HFC-134a of Mobile Air Conditioning Sector in China", Progressus Inquisitiones de Mutatione Climatis, (2015), vol. 11, No. 5, pp. 363-370, with English abstract.

* cited by examiner

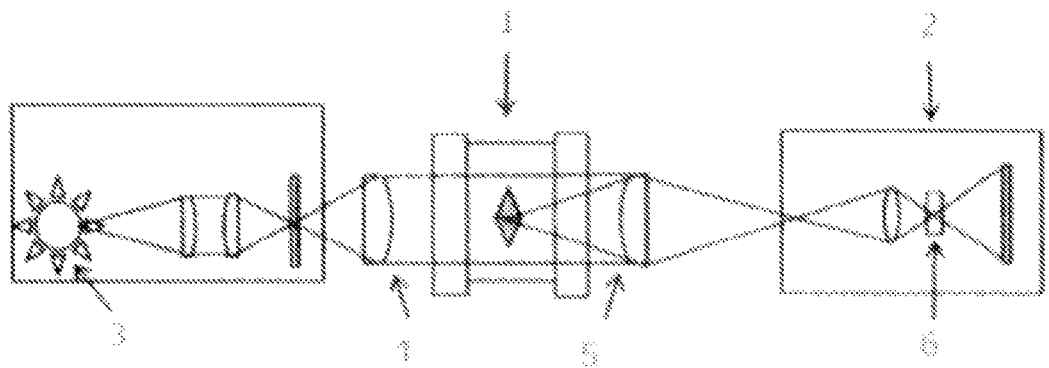

COMPOSITION INCLUDING REFRIGERANT, USE THEREFOR, REFRIGERATOR COMPRISING SAME, AND METHOD FOR OPERATING SAID REFRIGERATOR

TECHNICAL FIELD

The present disclosure relates to a composition containing a refrigerant, use of the composition, a refrigerating machine containing the composition, and a method for operating the refrigerating machine.

BACKGROUND ART

R404A is currently used as a refrigerant for refrigeration apparatuses such as freezing and refrigerating equipment for commercial use. R404A is a three-component mixture refrigerant composed of pentafluoroethane (R125) (44%), 1,1,1-trifluoroethane (R143a) (52%), and 1,1,1,2-tetrafluoroethane (R134a) (4%). However, the global warming potential (GWP) of R404A is 3920. Due to growing concerns over global warming, there is demand for refrigerants with a lower GWP. For this reason, various low-GWP mixed refrigerants that can replace R404A have been proposed (PTL 1 to 5).

R134a, which is used as a refrigerant for air-conditioning for vehicles, has a GWP of 1430. Thus, various mixed refrigerants with a low GWP that can replace R134a have been proposed (PTL 6).

CITATION LIST

Patent Literature

PTL 1: JP2012-526182A
PTL 2: JP2013-529703A
PTL 3: JP2015-511262A
PTL 4: JP2016-156001A
PTL 5: WO2015/141678A
PTL 6: WO2005/105947A

SUMMARY

A composition comprising a refrigerant, the refrigerant comprising trans-1,2-difluoroethylene (HFO-1132(E)) and 1,3,3,3-tetetrafluoropropene (R1234ze).

Advantageous Effects

The refrigerant according to the present disclosure has a low GWP.

BRIEF DESCRIPTION OF DRAWINGS

FIG. 1 is a schematic view of an apparatus used in a flammability test.

DESCRIPTION OF EMBODIMENTS

The present inventors conducted intensive research to solve the above problem, and found that a mixed refrigerant containing trans-1,2-difluoroethylene (HFO-3132(E)) and 1,3,3,3-tetrafluoropropene (R1234ze) in a specific ratio has the above properties.

The present disclosure was completed as a result of further research based on this finding. The present disclosure includes the following embodiments.

Definition of Terms

In the present disclosure, the term "refrigerant" includes at least compounds that are specified in ISO 817 (International Organization for Standardization), and that are given a refrigerant number (ASHRAE number) representing the type of refrigerant with "R" at the beginning; and further includes refrigerants that have properties equivalent to those of such refrigerants, even though a refrigerant number is not yet given. Refrigerants are broadly divided into fluorocarbon compounds and non-fluorocarbon compounds in terms of the structure of the compounds. Fluorocarbon compounds include chlorofluorocarbons (CFC), hydrochlorofluorocarbons (HCFC), and hydrofluorocarbons (HFC). Non-fluorocarbon compounds include propane (R290), propylene (R1270), butane (R600), isobutane (R600a), carbon dioxide (R744), and ammonia (R717).

In the present disclosure, the phrase "composition comprising a refrigerant" at least includes (1) a refrigerant itself (including a mixture of refrigerants), (2) a composition that further comprises other components and that can be mixed with at least a refrigeration oil to obtain a working fluid for a refrigerating machine, and (3) a working fluid for a refrigerating machine containing a refrigeration oil. In the present disclosure, of these three embodiments, the composition (2) is referred to as a "refrigerant composition" so as to distinguish it from a refrigerant itself (including a mixture of refrigerants). Further, the working fluid for a refrigerating machine (3) is referred to as a "refrigeration oil-containing working fluid" so as to distinguish it from the "refrigerant composition."

In the present disclosure, when the term "alternative" is used in a context in which the first refrigerant is replaced with the second refrigerant, the first type of "alternative" means that equipment designed for operation using the first refrigerant can be operated using the second refrigerant under optimum conditions, optionally with changes of only a few parts (at least one of the following: refrigeration oil, gasket, packing, expansion valve, dryer, and other parts) and equipment adjustment. In other words, this type of alternative means that the same equipment is operated with an alternative refrigerant. Embodiments of this type of "alternative" include "drop-in alternative," "nearly drop-in alternative," and "retrofit," in the order in which the extent of changes and adjustment necessary for replacing the first refrigerant with the second refrigerant, is smaller.

The term "alternative" also includes a second type of "alternative," which means that equipment designed for operation using the second refrigerant is operated for the same use as the existing use achieved with the first refrigerant by using the second refrigerant. This type of alternative means that the same use is achieved with an alternative refrigerant.

In the present disclosure, the term "refrigerating machine" refers to machines in general that draw heat from an object or space to make its temperature lower than the temperature of ambient air, and maintain a low temperature. In other words, refrigerating machines refer to conversion machines that gain energy from the outside to do work, and that perform energy conversion, in order to transfer heat from where the temperature is lower to where the temperature is higher.

In the present specification, the term "air-conditioning system for vehicles" is a type of refrigeration apparatus for use in vehicles, such as gasoline vehicles, hybrid vehicles, plug-in hybrid vehicles, electric vehicles, and hydrogen vehicles (including fuel-cell vehicles). The air-conditioning system for vehicles refers to a refrigeration apparatus that has a refrigeration cycle in which heat exchange is performed by an evaporator using a liquid refrigerant, the evaporated refrigerant gas is absorbed by a compressor, the adiabatically compressed refrigerant gas is cooled and liquefied with a condenser, the liquefied refrigerant is adiabatically expanded by passing it through an expansion valve, and then the refrigerant is supplied again in the form of a liquid to the evaporator.

In the present specification, the term "turbo refrigerating machine" refers to a type of large chiller refrigeration apparatus and indicates a refrigeration apparatus that has a refrigeration cycle in which heat exchange is performed by an evaporator using a liquid refrigerant, the evaporated refrigerant gas is absorbed by a centrifugal compressor, the adiabatically compressed refrigerant gas is cooled and liquefied with a condenser, the liquefied refrigerant is adiabatically expanded by passing it through an expansion valve, and then the refrigerant is supplied again in the form of a liquid to the evaporator. The term "large chiller refrigerating machine" refers to a type of chiller and indicates a large air-conditioner intended for air conditioning in a building unit.

In the present disclosure, "a refrigerant having WCF lower-flammability" means that a most flammable formulation (worst case of formulation for flammability) in accordance with U.S. ANSI/ASHRAE Standard 34-2013 has a burning velocity of 10 cm/s or less. In the present disclosure, "a refrigerant having an ASHRAE lower-flammability" means that the WCF burning velocity is 10 cm/s or less, and that the most flammable faction formulation (worst case of fractionation for flammability: WCFF) determined by conducting a leakage test in storage, shipping, and use in accordance with ANSI/ASHRAE Standard 34-2013 by using WCF has a burning velocity of 10 cm/s or less, and is classified under the category of "Class 2L" in the flammability classification of U.S. ANSI/ASHRAE Standard 34-2013.

In the present disclosure, the compression ratio of the refrigerant can be determined by the following: condensation pressure (MPa)/evaporation pressure (MPa).

1. Refrigerant

The refrigerant according to the present disclosure is a mixed refrigerant containing trans-1,2-difluoroethylene (HFO-1132(E)) and 1,3,3,3-tetrafluoropropene (R1234ze).

1.1. Refrigerant A

Refrigerant A my contain, as R1234ze, either R1234ze(E) or R1234ze(Z), or both, and preferably contains R1234ze (E).

Refrigerant A is an example of the refrigerant according to the present disclosure. Refrigerant A contains HFO-1132 (E) in an amount of 35.3 to 72.0 mass %, and R1234ze in an amount of 64.7 to 28.0 mass %, based on the total amount of HFO-1132(E) and R1234ze. Refrigerant A according to the present disclosure preferably contains HFO-1132(E) in an amount of 35.3 to 3.8.4 mass %, and R1234ze in an amount of 64.7 to 61.6 mass %, based on the total amount of HFO-1132(E) and R1234ze.

In this case, refrigerant A according to the present, disclosure falls under the category of WCF lower flammability, and has a GWP of 4 or less and a refrigerating capacity of 70% or more relative to R404A.

Additionally, when used in operating a refrigeration cycle having an evaporating temperature of 5° C. or less, refrigerant A according to the present disclosure has a compression ratio of 2.5 or more, and can ensure efficiency of refrigeration cycle within a sufficient range.

Additionally, when used in operating a refrigeration cycle having an evaporating temperature of −60° C. or mere, refrigerant A according to the present disclosure has an evaporation pressure of 0.02 MPa or more; this makes suction of the refrigerant into a compressor relatively easy.

Refrigerant A according to the present disclosure preferably contains HFO-1132(E) in an amount of 35.3 to 38.4 mass %, and R1234ze in an amount of 64.7 to 61.6 mass %, based on the total amount of HFO-1132(E) and R1234ze.

In this case, refrigerant A according to the present disclosure falls under the category of ASHRAE lower flammability, and has a GWP of 4 or less and a refrigerating capacity of 70% or more relative to R404A.

1.2. Refrigerant B

Refrigerant B is an example of the refrigerant according to the present disclosure. Refrigerant B contains HFO-1132 (E) in an amount of 14.1 to 38.4 mass %, and R1234ze in an amount of 85.9 to 61.6 mass %, based on the total amount of HFO-1132(E) and R1234ze.

In this case, refrigerant B according to the present disclosure falls under the category of ASHRAE lower flammability, and has a refrigerating capacity of 100% or more relative to R134a.

Refrigerant B preferably contains HFO-1132(E) in an amount of 22.1 to 38.4 mass %, and R1234ze in an amount of 77.3 to 61.6 mass %, based on the total amount of HFO-1132(E) and R1234ze. In this case, refrigerant B according to the present disclosure has a boiling point of −40° C. or less.

The refrigerant more preferably contains HFO-1132(E) in an amount of 35.3 to 38.4 mass %, and R1234ze in an amount of 64.7 to 61.6 mass %, based on the total amount of HFO-1132(E) and R1234ze.

In this case, refrigerant B according to the present disclosure has a boiling point of −44° C. or less.

The refrigerant according to the present disclosure may further contain other additional refrigerants in addition to HFO-1132(E) and R1234ze, as long as the above properties and effects are not impaired. In this respect, the refrigerant according to the present disclosure contains HFO-1132(E) and R1234ze in a total amount of preferably 99.5 mass % or more, more preferably 99.75 mass % or more, and still more preferably 99.9 mass % or more based on the entire refrigerant. The refrigerant according to the present disclosure may be composed only of HFO-1132(E) and R1234ze.

Such additional refrigerants are not limited, and can be selected from a wide range of refrigerants. The refrigerant according to the present disclosure may contain a single additional refrigerant, or two or more additional refrigerants.

1.2 Use

The refrigerant according to the present disclosure can be preferably used as a working fluid in a refrigerating machine.

Refrigerant A according to the present disclosure is suitable for use as an alternative refrigerant for R404A. Refrigerant B according to the present, disclosure is suitable for use as an alternative refrigerant for at least one refrigerant selected from the group consisting of R134a, R1234yf, and $CO_2$. Refrigerant B according to the present disclosure is particularly suitable for use as an alternative refrigerant for R134a.

In particular, refrigerant B according to the present disclosure is preferably used as a working fluid in an air-conditioning system, a refrigerator, a freezer, a water cooler, ah ice maker, a refrigerating showcase, a freezing showcase, a freezing and refrigerating unit, a refrigerating machine for freezing and refrigerating warehouses, an air-conditioning system for vehicles, a turbo refrigerating machine, or a screw refrigerating machine.

Refrigerant B according to the present disclosure is preferably used as a working fluid particularly in an air-conditioning system for vehicles. In this case, refrigerant B ensures a burning velocity of loss than 10.0 cm/s, which contributes to the safety of refrigerants used in an air-conditioning system for vehicles.

Using refrigerant B according to the present disclosure in an air-conditioning system for vehicles is advantageous in enabling heating with a heat pump that consumes less power than electric heaters. Additionally, R134a has a boiling point of −26.1° C., and R1234yf has a boiling point of −29.5° C.; thus, when these refrigerants are individually used in an air-conditioning system for vehicles, heating operation is not possible at an outside air temperature of −30° C. or below.

The air-conditioning system for vehicles in which refrigerant B according to the present disclosure is used is preferably an air-conditioning system for gasoline vehicles, hybrid vehicles, plug-in hybrid vehicles, electric vehicles, or hydrogen vehicles. Of these, from the standpoint of improving the vehicle travel distance while heating the interior of the vehicle with a heat pump, the air-conditioning system for vehicles in which refrigerant B according to the present disclosure is used is particularly preferably an air-conditioning system for electric vehicles. Specifically, in the present disclosure, refrigerant. B according to the present disclosure is particularly preferably used in electric vehicles.

Refrigerant B according to the present disclosure is preferably used in an air-conditioning system for gasoline vehicles, an air-conditioning system for hybrid vehicles, an air-conditioning system for plug-in hybrid vehicles, an air-conditioning system for electric vehicles, or an air-conditioning system for hydrogen vehicles. Refrigerant B according to the present disclosure is particularly preferably used in an air-conditioning system for electric vehicles.

Refrigerant B according to the present disclosure is preferably used in the refrigeration apparatus of vehicles, such as gasoline vehicles, hybrid vehicles, plug-in hybrid vehicles, electric vehicles, hydrogen vehicles, and fuel cell vehicles. Of these, refrigerant B according to the present disclosure is particularly preferably used in the refrigeration unit of electric vehicles, which cannot use engine exhaust heat.

Even in vehicles, such as gasoline vehicles, hybrid vehicles, plug-in hybrid vehicles, hydrogen vehicles, and fuel cell vehicles, a heater of heat-pump system equipped with refrigerant s according to the present disclosure can immediately warm the interior of these vehicles in a situation in which engine exhaust heat cannot be used due to, for example, defects in the thermostat at the start of the engine.

In the present disclosure, refrigerant B according to the present disclosure has a boiling point of preferably −5.1.2 to −40.0° C., more preferably −50.0 to −41.0° C., and still more preferably −48.0 to −42.0° C., because heating the interior of vehicles with a heat pump requires pressure equal to or higher than atmospheric pressure at −40° C.

2. Refrigerant Composition

The refrigerant composition according to the present disclosure contains at least the refrigerant according to the present disclosure, and can be used for the same use as the refrigerant according to the present disclosure. Moreover, the refrigerant composition according to the present disclosure can be further mixed with at least a refrigeration oil to thereby obtain a working fluid for a refrigerating machine.

The refrigerant composition according to the present disclosure further contains at least one other component in addition to the refrigerant according to the present disclosure. The refrigerant composition according to the present disclosure may contain at least one of the following other components, if necessary. As described above, when the refrigerant composition according to the present disclosure is used as a working fluid in a refrigerating machine, it is generally used as a mixture with at least a refrigeration oil. Therefore, it is preferable that the refrigerant composition according to the present disclosure does not substantially contain a refrigeration oil. Specifically, in the refrigerant composition according to the present disclosure, the content of the refrigeration oil based on the entire refrigerant composition is preferably 0 to 1 mass %, and more preferably 0 to 0.1 mass %.

2.1. Water

The refrigerant composition according to the present disclosure may contain a small amount of water. The water content of the refrigerant composition is preferably 0.1 mass % or less based on the entire refrigerant. A small amount of water contained in the refrigerant composition stabilizes double bonds in the molecules of unsaturated fluorocarbon compounds that can be present in the refrigerant, and makes it less likely that the unsaturated fluorocarbon compounds will be oxidized, thus increasing the stability of the refrigerant composition.

2.2. Tracer

A tracer is added to the refrigerant composition according to the present disclosure at a detectable concentration such that when the refrigerant composition has been diluted, contaminated, or undergone other changes, the tracer can trace the changes.

The refrigerant composition according to the present disclosure may contain a single tracer, or two or more tracers.

The tracer is not limited, and can be suitably selected from commonly used tracers.

Examples of tracers include hydrofluorocarbons, hydrochlorofluorocarbons, chlorofluorocarbons, hydrochlorocarbons, fluorocarbons, deuterated hydrocarbons, deuterated hydrofluorocarbons, perfluorocarbons, fluoroethers, brominated compounds, iodinated compounds, alcohols, aldehydes, ketones, and nitrous oxide ($N_2O$). The tracer is particularly preferably a hydrofluorocarbon, hydrochlorofluorocarbon, chlorofluorocarbon, hydrochlorocarbon, fluorocarbon, or fluoroether.

The following compounds are preferable as the tracer.

FC-14 (tetrafluoromethane, $CF_4$)
HCC-40 (chloromethane, $CH_3Cl$)
HFC-23 (trifluoromethane, $CHF_3$)
HFC-41 (fluoromethane, $CH_3Cl$)
HFC-125 (pentafluoroethane, $CF_3CHF_2$)
HFC-134a (1,1,1,2-tetrafluoroethane, $CF_3CH_2F$)
HFC-134 (1,1,2,2-tetrafluoroethane, $CHF_2CHF_2$)
HFC-143a (1,1,1-trifluoroethane, $CF_3CH_3$)
HFC-143 (1,1,2-trifluoroethane, $CHF_2CH_2F$)
HFC-152a (1,1-difluoroethane, $CHF_2CH_3$)
HFC-152 (1,2-difluoroethane, $CH_2FCH_2F$)
HFC-161 (fluoroethane, $CH_3CH_2F$)
HFC-245fa (1,1,1,3,3-pentafluoropropane, $CF_3CH_2CHF_2$)
HFC-236fa (1,1,1,3,3,3-hexafluoropropane, $CF_3CH_2CF_3$)

HFC-236ea (1,1,1,2,3,3-hexafluoropropane, $CF_3CHFCHF_2$)
HFC-227ea (1,1,1,2,3,3,3-heptafluoropropane, $CF_3CHFCF_3$)
HCFC-22 (chlorodifluoromethane, $CHClF_2$)
HCFC-31 (chlorofluoromethane, $CH_2ClF$)
CFC-1113 (chlorotrifluoroethylene, $CF_2=CClF$)
HFE-125 (trifluoromethyl-difluoromethyl ether, $CF_3OCHF_2$)
HFE-134(trifluoromethyl-fluororoethyl ether, $CF_3OCH_2F$)
HFE-143(trifluoromethyl-methyl ether, $CF_3OCH_3$)
HFE-227ea (trifluoromethyl-tetrafluoroethyl ether, $CF_3OCHFCF_3$)
HFE-236fa (trifluoromethyl-trifluoroethyl ether, $CF_3OCH_2CF_3$)

The refrigerant composition according to the present disclosure may contain a tracer in a total amount of about 10 parts per million by weight (ppm) to about 1000 ppm based on the entire refrigerant composition. The refrigerant composition according to the present disclosure may contain a tracer in a total amount of preferably about 30 ppm to about 500 ppm, and more preferably about 50 ppm to about 300 ppm, based on the entire refrigerant composition.

2.3. Ultraviolet Fluorescent Dye

The refrigerant composition according to the present disclosure may contain a single ultraviolet fluorescent dye, or two or more ultraviolet fluorescent dyes.

The ultraviolet fluorescent dye is not limited, and can be suitably selected from commonly used ultraviolet fluorescent dyes.

Examples of ultraviolet fluorescent dyes include naphthalimide, coumarin, anthracene, phenanthrene, xanthene, thioxanthene, naphthoxanthene, fluorescein, and derivatives thereof. The ultraviolet fluorescent dye is particularly preferably either naphthalimide or coumarin, or both.

2.4. Stabilizer

The refrigerant composition according to the present disclosure may contain a single stabilizer, or two or more stabilizers.

The stabilizer is not limited, and can be suitably selected from commonly used stabilizers.

Examples of stabilizers include nitro compounds, ethers, and amines.

Examples of nitro compounds include aliphatic nitro compounds, such as nitromethane and nitroethane; and aromatic nitro compounds, such as nitrobenzene and nitrostyrene.

Examples of ethers include 1,4-dioxane.

Examples of amines include 2,2,3,3,3-pentafluoropropylamine and diphenylamine.

Examples of stabilizers also include butylhydroxyxylene and benzotriazole.

The content of the stabilizer is not limited. Generally, the content of the stabilizer is preferably 0.01 to 5 mass %, and more preferably 0.05 to 2 mass %, based on the entire refrigerant.

2.5. Polymerization Inhibitor

The refrigerant composition according to the present disclosure may contain a single polymerization inhibitor, or two or more polymerization inhibitors.

The polymerization inhibitor is not limited, and can be suitably selected from commonly used polymerization inhibitors.

Examples of polymerization inhibitors include 4-methoxy-1-naphthol, hydroquinone, hydroquinone methyl ether, dimethyl-t-butylphenol, 2,6-di-tert-butyl-p-cresol, and benzotriazole.

The content of the polymerization inhibitor is not limited. Generally, the content of the polymerization inhibitor is preferably 0.01 to 5 mass %, and more preferably 0.05 to 2 mass %, based on the entire refrigerant.

3. Refrigeration Oil-Containing Working Fluid

The refrigeration oil-containing working fluid according to the present disclosure contains at least the refrigerant or refrigerant composition according to the present disclosure and a refrigeration oil, and is used as a working fluid in a refrigerating machine. Specifically, the refrigeration oil-containing working fluid according to the present disclosure is obtained by mixing a refrigeration oil used in a compressor of a refrigerating machine with the refrigerant or the refrigerant composition. The refrigeration oil-containing working fluid generally contains 10 to 50 mass % of refrigeration oil.

3.1. Refrigeration Oil

The refrigeration oil-containing working fluid according to the present disclosure may contain a single refrigeration oil, or two or more refrigeration oils.

The refrigeration oil is not limited, and can be suitably selected from commonly used refrigeration oils. In this case, refrigeration oils that are superior in the action of increasing the miscibility with the mixture and the stability of the mixture, for example, are suitably selected as necessary.

The base oil of the refrigeration oil is preferably, for example, at least one member selected from the group consisting of polyalkylene glycols (PAG), polyol esters (POE), and polyvinyl ethers (PVE).

The refrigeration oil may further contain additives in addition to the base oil. The additive may be at least one member selected from the group consisting of antioxidants, extreme-pressure agents, acid scavengers, oxygen scavengers, copper deactivators, rust inhibitors, oil agents, and antifoaming agents.

A refrigeration oil with a kinematic viscosity of 5 to 400 cSt at 40° C. is preferable from the standpoint of lubrication.

The refrigeration oil-containing working fluid according to the present disclosure may further optionally contain at least one additive. Examples of additives include the compatibilizing agents described below.

3.2. Compatibilizing Agent

The refrigeration oil-containing working fluid according to the present disclosure may contain a single compatibilizing agent, or two or more compatibilizing agents.

The compatibilizing agent is not limited, and can be suitably selected from commonly used compatibilizing agents.

Examples of compatibilizing agents include polyoxyalkylene glycol ethers, amides, nitriles, ketones, chlorocarbons, esters, lactones, aryl ethers, fluoroethers, and 1,1,1-trifluoroalkanes. The compatibilizing agent is particularly preferably a polyoxyalkylene glycol ether.

4. Method for Operating Refrigerating Machine

The method for operating a refrigerating machine according to the present disclosure is a method for operating a refrigerating machine using the refrigerant according to the present disclosure.

Specifically, the method for operating a refrigerating machine according to the present disclosure includes circulating the refrigerant according to the present disclosure in a refrigerating machine.

In particular, the method for operating a refrigerating machine by using refrigerant B according to the present disclosure is preferably a method using as a refrigerating machine an air-conditioning system, a refrigerator, a freezer, a water cooler, an ice maker, a refrigerating showcase, a freezing showcase, a freezing and refrigerating unit, a refrigerating machine for freezing and refrigerating warehouses, an air-conditioning system for vehicles, a turbo refrigerating machine, or a screw refrigerating machine. The method for operating a refrigerating machine by using refrigerant B according to the present disclosure is particularly preferably a method for operating an air-conditioning system for vehicles.

The method for operating a refrigerating machine by using refrigerant B according to the present disclosure is preferably a method for operating the refrigeration apparatus of vehicles, such as gasoline vehicles, hybrid vehicles, plug-in hybrid vehicles, electric vehicles, hydrogen vehicles, and fuel cell vehicles. Of these, the method is particularly preferably a method for operating the refrigeration apparatus of electric vehicles, which cannot use engine exhaust heat, by using refrigerant B according to the present disclosure.

The embodiments are described above; however, it will be understood that various changes in forms and details can be made without departing from the spirit and scope of the claims.

Item 1.

A composition comprising a refrigerant, the refrigerant comprising trans-1,2-difluoroethylene (HFO-1132(E)) and 1,3,3,3-tetrafluoropropene (R1234ze).

Item 2.

The composition according to Item 1, wherein the refrigerant contains HFO-1132(E) in an amount of 35.3 to 72.0 mass %, and R1234ze in an amount of 64.7 to 28.0 mass %, based on the total amount of HFO-1132(E) and R1234ze.

Item 3.

The composition according to Item 1, wherein the refrigerant contains HFO-1132(E) in an amount of 35.3 to 38.4 mass %, and R1234ze in an amount of 64.7 to 61.6 mass %, based on the total amount of HFO-1132(E) and R1234ze.

Item 4.

The composition according to any one of Items 1 to 3, which is for use as a working fluid for a refrigerating machine, the composition further comprising a refrigeration oil.

Item 5.

The composition according to any one of Items 1 to 4, which is for use in operating a refrigeration cycle having an evaporating temperature of −60 to 5° C.

Item 6.

The composition according to any one of Items 1 to 5, which is for use as an alternative refrigerant for R404A.

Item 7.

Use of the composition of any one of Items 1 to 4 as an alternative refrigerant for R404A.

Item 8.

A refrigerating machine comprising the composition of any one of Items 1 to 4 as a working fluid.

Item 9.

The refrigerating machine according to Item 8, comprising a refrigeration cycle having an evaporating temperature of −60 to 5° C.

Item 10.

A method for operating a refrigerating machine, comprising circulating the composition of any one of Items 1 to 4 as a working fluid in a refrigerating machine.

Item 11.

The method according to Item 10, wherein the refrigerating machine comprises a refrigeration cycle having an evaporating temperature of −60 to 5° C.

Item 12.

The composition according to Item 1, which is for use as an alternative refrigerant for at least one refrigerant selected from the group consisting of R134a, 2,3,3,3-tetrafluoropropene (R1234yf), and $CO_2$ (R744),
wherein the refrigerant contains HFO-1132(E) in an amount of 14.1 to 38.4 mass %, and R1234ze in an amount of 85.9 to 61.6 mass %, based on the total amount of HFO-1132(E) and R1234ze.

Item 13.

The composition according to Item 1, which is for use as an alternative refrigerant for at least one refrigerant selected from the group consisting of R134a, R1234yf, and $CO_2$,
wherein the refrigerant contains HFO-1132(E) in an amount of 22.7 to 38.4 mass %, and R1234ze in an amount of 77.3 to 61.6 mass %, based on the total amount of HFO-1132(E) and R1234ze.

Item 14.

The composition according to Item 1, which is for use as an alternative refrigerant for at least one refrigerant selected from the group consisting of R134a, R1234yf, and $CO_2$,
wherein the refrigerant contains HFO-1132(E) in an amount of 35.3 to 38.4 mass %, and R1234ze in an amount of 64.7 to 61.6 mass %, based on the total amount of HFO-1132(E) and R1234ze.

Item 15.

The composition according to any one of Items 12 to 14, which is for use as an alternative refrigerant for R134a.

Item 16.

The composition according to any one of Items 1 to 3 and 12 to 15, which is for use as a working fluid for a refrigerating machine, the composition further comprising a refrigeration oil.

Item 17.

The composition according to any one of Items 12 to 16, which is for use as a working fluid in an air-conditioning system, a refrigerator, a freezer, a water cooler, an ice maker, a refrigerating showcase, a freezing showcase, a freezing and refrigerating unit, a refrigerating machine for freezing and refrigerating warehouses, an air-conditioning system for vehicles, a turbo refrigerating machine, or a screw refrigerating machine.

Item 18.

The composition according to any one of Items 12 to 16, which is for use as a working fluid in an air-conditioning system for vehicles.

Item 19.

A refrigerating machine comprising the composition of any one of Items 12 to 16 as a working fluid.

Item 20.

The refrigerating machine according to Item 19, which is an air-conditioning system, a refrigerator, a freezer, a water cooler, an ice maker, a refrigerating showcase, a freezing showcase, a freezing and refrigerating unit, a refrigerating machine for freezing and refrigerating warehouses, an air-conditioning system for vehicles, a turbo refrigerating machine, or a screw refrigerating machine.

Item 21.

The refrigerating machine according to Item 19, which is an air-conditioning system for vehicles.

Item 22.

A method for operating a refrigerating machine, comprising circulating the composition of any one of Items 12 to 16 as a working fluid in a refrigerating machine.

Item 23.

The method according to Item 22, wherein the refrigerating machine is an air-conditioning system, a refrigerator, a freezer, a water cooler, an ice maker, a refrigerating showcase, a freezing showcase, a freezing and refrigerating unit, a refrigerating machine for freezing and refrigerating warehouses, an air-conditioning system for vehicles, a turbo refrigerating machine, or a screw refrigerating machine.

Item 24.

The method according to Item 22, wherein the refrigerating machine is an air-conditioning system for vehicles.

EXAMPLES

The present disclosure is described in more detail below with reference to Examples. However, the present disclosure is not limited to the Examples.

Mixed refrigerants were prepared by mixing HFO-1132 (E) and R1234ze in mass % shown in Tables 1 to 5 based on their sum.

The GWP of R404A (R125=44%/R143A=52%/R134A=4%) and the mixed refrigerants was evaluated based on the values stated in the Intergovernmental Panel on Climate Change (IPCC), fourth assessment report. The GWP of HFO-1132(E), which was not stated therein, was assumed to be 1 from HFO-1132a (GWP=1 or less) and HFO-1123 (GWP=0.3, described in PTL 1). The refrigerating capacity of R404A and the mixed refrigerants was determined by performing theoretical refrigeration cycle calculations for the mixed refrigerants using the National Institute of Science and Technology (NIST) and Reference Fluid Thermodynamic and Transport Properties Database (Refprop 9.0) under the following conditions.

The COP and refrigerating capacity of these mixed refrigerants relative to those of R404A were determined. The computational conditions were as follows.

Evaporating temperature: the temperatures shown in the tables.
Condensation temperature: 40° C.
Superheating temperature: −20K
Subcooling temperature: 0K
Compressor efficiency: 70%

Table 1 shows these values together with the GWP of each mixed refrigerant. The COP and refrigerating capacity are percentages relative to R404A.

The coefficient of performance (COP) was determined by the following formula.

$$COP = (\text{refrigerating capacity or heating capacity}) / \text{power consumption}$$

TABLE 1

| Evaporating Temperature−50° C. | | | | | | | | |
|---|---|---|---|---|---|---|---|---|
| Item | | Com Ex1-1 | Com Ex2-1 | Com Ex3-1 | Example1-1 | Example2-1 | Example3-1 |
| HFO-1132E | mass % | R404A | 20.0 | 30.0 | 35.3 | 38.4 | 40.0 |
| R1234ze | mass % | | 80.0 | 70.0 | 64.7 | 61.6 | 60.0 |
| COPc Ratio | % (relative to R40A) | 100.0 | 111.9 | 111.2 | 111 | 111 | 110.6 |
| Refrigerating Capacity Ratio | % (relative to R40A) | 100.0 | 53.2 | 64.7 | 72.6 | 75.1 | 77.1 |
| Discharge Pressure | Mpa | 1.822 | 1.166 | 1.339 | 1.447 | 1.480 | 1.506 |
| Evaporation Pressure | Mpa | 0.082 | 0.033 | 0.041 | 0.046 | 0.048 | 0.050 |
| Compression Ratio | — | 22.2 | 35.7 | 33.0 | 31.2 | 30.7 | 30.3 |
| Evaporating Temperature−50° C. | | | | | | |
| Item | | Example4-1 | Example5-1 | Example6-1 | Example7-1 | Com Ex4-1 |
| HFO-1132E | mass % | 50.0 | 60.0 | 70.0 | 72.0 | 80.0 |
| R1234ze | mass % | 50.0 | 40.0 | 30.0 | 28.0 | 20.0 |
| COPc Ratio | % (relative to R40A) | 109.8 | 108.9 | 108.3 | 108.2 | 107.9 |
| Refrigerating Capacity Ratio | % (relative to R40A) | 90.0 | 103.3 | 117.2 | 120.1 | 131.9 |
| Discharge Pressure | Mpa | 1.669 | 1.828 | 1.983 | 2.013 | 2.132 |
| Evaporation Pressure | Mpa | 0.059 | 0.070 | 0.081 | 0.083 | 0.093 |
| Compression Ratio | — | 28.1 | 26.2 | 24.5 | 24.2 | 23.0 |
| Evaporating Temperature−35° C. | | | | | | | | |
| Item | | Com Ex1-2 | Com Ex2-2 | Com Ex3-2 | Example1-2 | Example2-2 | Example3-2 |
| HFO-1132E | mass % | R404A | 20.0 | 30.0 | 35.3 | 38.4 | 40.0 |
| R1234ze | mass % | | 80.0 | 70.0 | 64.7 | 61.6 | 60.0 |
| COPc Ratio | % (relative to R40A) | 100.0 | 110.7 | 109.5 | 109 | 109 | 108.7 |
| Refrigerating Capacity Ratio | % (relative to R40A) | 100.0 | 58.5 | 69.8 | 77.2 | 79.4 | 81.3 |
| Discharge Pressure | Mpa | 1.822 | 1.166 | 1.339 | 1.447 | 1.480 | 1.506 |
| Evaporation Pressure | Mpa | 0.165 | 0.074 | 0.091 | 0.102 | 0.106 | 0.109 |
| Compression Ratio | — | 11.0 | 15.7 | 14.8 | 14.2 | 14.0 | 13.9 |

TABLE 1-continued

| Evaporating Temperature−35° C. | | | | | | |
|---|---|---|---|---|---|---|
| Item | | Example4-2 | Example5-2 | Example6-2 | Example7-2 | Com Ex4-2 |
| HFO-1132E | mass % | 50.0 | 60.0 | 70.0 | 72.0 | 80.0 |
| R1234ze | mass % | 50.0 | 40.0 | 30.0 | 28.0 | 20.0 |
| COPc Ratio | % (relative to R40A) | 107.6 | 106.6 | 105.8 | 105.7 | 105.2 |
| Refrigerating Capacity Ratio | % (relative to R40A) | 92.6 | 104.1 | 115.9 | 118.3 | 128.0 |
| Discharge Pressure | Mpa | 1.669 | 1.828 | 1.983 | 2.013 | 2.132 |
| Evaporation Pressure | Mpa | 0.127 | 0.147 | 0.167 | 0.171 | 0.188 |
| Compression Ratio | — | 13.1 | 12.5 | 11.9 | 11.8 | 11.3 |

| Evaporating Temperature−10° C. | | | | | | | |
|---|---|---|---|---|---|---|---|
| Item | | Com Ex1-3 | Com Ex2-3 | Com Ex3-3 | Example1-3 | Example2-3 | Example3-3 |
| HFO-1132E | mass % | R404A | 20.0 | 30.0 | 35.3 | 38.4 | 40.0 |
| R1234ze | mass % |  | 80.0 | 70.0 | 64.7 | 61.6 | 50.0 |
| COPc Ratio | % (relative to R40A) | 100.0 | 108.3 | 107.3 | 107 | 106 | 106.1 |
| Refrigerating Capacity Ratio | % (relative to R40A) | 100.0 | 66.1 | 76.5 | 82.8 | 84.7 | 86.3 |
| Discharge Pressure | Mpa | 1.822 | 1.166 | 1.339 | 1.447 | 1.480 | 1.506 |
| Evaporation Pressure | Mpa | 0.434 | 0.228 | 0.271 | 0.300 | 0.308 | 0.315 |
| Compression Ratio | — | 4.2 | 5.1 | 4.9 | 4.8 | 4.8 | 4.8 |

| Evaporating Temperature−10° C. | | | | | | |
|---|---|---|---|---|---|---|
| Item | | Example4-3 | Example5-3 | Example6-3 | Example7-3 | Com Ex4-3 |
| HFO-1132E | mass % | 50.0 | 60.0 | 70.0 | 72.0 | 80.0 |
| R1234ze | mass % | 50.0 | 40.0 | 30.0 | 28.0 | 20.0 |
| COPc Ratio | % (relative to R40A) | 104.8 | 103.5 | 102.6 | 102.4 | 101.8 |
| Refrigerating Capacity Ratio | % (relative to R40A) | 95.6 | 104.8 | 114.0 | 115.8 | 123.0 |
| Discharge Pressure | Mpa | 1.669 | 1.828 | 1.983 | 2.013 | 2.132 |
| Evaporation Pressure | Mpa | 0.360 | 0.406 | 0.452 | 0.461 | 0.499 |
| Compression Ratio | — | 4.6 | 4.5 | 4.4 | 4.4 | 4.3 |

| Evaporating Temperature−80° C. | | | | | | | |
|---|---|---|---|---|---|---|---|
| Item | | Com Ex1-4 | Com Ex2-4 | Com Ex3-4 | Example1-4 | Example2-4 | Example3-4 |
| HFO-1132E | mass % | R404A | 20.0 | 30.0 | 35.3 | 38.4 | 40.0 |
| R1234ze | mass % |  | 80.0 | 70.0 | 64.7 | 61.6 | 60.0 |
| COPc Ratio | % (relative to R40A) | 100.0 | 117.1 | 116.0 | 116 | 116 | 115.6 |
| Refrigerating Capacity Ratio | % (relative to R40A) | 100.0 | 41.5 | 61.9 | 60.3 | 63.1 | 65.5 |
| Discharge Pressure | Mpa | 1.822 | 1.166 | 1.339 | 1.447 | 1.480 | 1.506 |
| Evaporation Pressure | Mpa | 0.014 | 0.004 | 0.005 | 0.006 | 0.006 | 0.006 |
| Compression Ratio | — | 134.6 | 294.7 | 265.8 | 244.5 | 237.9 | 232.6 |

| Evaporating Temperature−80° C. | | | | | | |
|---|---|---|---|---|---|---|
| Item | | Example4-4 | Example5-4 | Example6-4 | Example7-4 | Com Ex4-4 |
| HFO-1132E | mass % | 50.0 | 60.0 | 70.0 | 72.0 | 80.0 |
| R1234ze | mass % | 50.0 | 40.0 | 30.0 | 28.0 | 20.0 |
| COPc Ratio | % (relative to R40A) | 115.6 | 115.4 | 115.3 | 116.2 | 115.3 |
| Refrigerating Capacity Ratio | % (relative to R40A) | 81.9 | 100.1 | 120.1 | 124.4 | 142.9 |
| Discharge Pressure | Mpa | 1.669 | 1.828 | 1.983 | 2.013 | 2.132 |
| Evaporation Pressure | Mpa | 0.008 | 0.010 | 0.013 | 0.013 | 0.015 |
| Compression Ratio | — | 201.9 | 177.6 | 157.7 | 154.2 | 140.3 |

TABLE 1-continued

| | | Evaporating Temperature 10° C. | | | | | |
|---|---|---|---|---|---|---|---|
| Item | | Com Ex1-5 | Com Ex2-5 | Com Ex3-5 | Example1-5 | Example2-5 | Example3-5 |
| HFO-1132E | mass % | R404A | 20.0 | 30.0 | 35.3 | 38.4 | 40.0 |
| R1234ze | mass % | | 80.0 | 70.0 | 64.7 | 61.6 | 60.0 |
| COPc Ratio | % (relative to R40A) | 100.0 | 107.1 | 106.0 | 105 | 105 | 104.5 |
| Refrigerating Capacity Ratio | % (relative to R40A) | 100.0 | 70.8 | 80.3 | 86.0 | 87.7 | 89.0 |
| Discharge Pressure | Mpa | 1.822 | 1.166 | 1.339 | 1.447 | 1.480 | 1.506 |
| Evaporation Pressure | Mpa | 0.820 | 0.473 | 0.554 | 0.605 | 0.621 | 0.633 |
| Compression Ratio | — | 2.2 | 2.5 | 2.4 | 2.4 | 2.4 | 2.4 |

| | | Evaporating Temperature 10° C. | | | | |
|---|---|---|---|---|---|---|
| Item | | Example4-5 | Example5-5 | Example6-5 | Example7-5 | Com Ex4-5 |
| HFO-1132E | mass % | 50.0 | 60.0 | 70.0 | 72.0 | 80.0 |
| R1234ze | mass % | 50.0 | 40.0 | 30.0 | 28.0 | 20.0 |
| COPc Ratio | % (relative to R40A) | 103.0 | 101.7 | 100.6 | 100.4 | 99.8 |
| Refrigerating Capacity Ratio | % (relative to R40A) | 97.2 | 105.0 | 112.5 | 114.0 | 119.8 |
| Discharge Pressure | Mpa | 1.669 | 1.828 | 1.983 | 2.013 | 2.132 |
| Evaporation Pressure | Mpa | 0.713 | 0.792 | 0.872 | 0.888 | 0.950 |
| Compression Ratio | — | 2.3 | 2.3 | 2.3 | 2.3 | 2.2 |

A burning velocity test was performed using the apparatus shown in FIG. 1 in the following manner. First, the mixed refrigerants were purified to 99.5% or more, and were deaerated by repeating a cycle of freezing, pumping, and thawing until no traces of air were observed on the vacuum gauge. The burning velocity was measured by the closed method. The initial temperature was ambient temperature. Ignition was performed by generating an electric spark between the electrodes in the center of a sample cell. The duration of the discharge was 1.0 to 9.9 ms, and the ignition energy was typically about 0.1 to 1.0 J. The propagation of the flame was visualized by schlieren photography. A cylindrical container (inner diameter: 155 mm, length: 198 mm) equipped with two light-transmissive acrylic windows was used as the sample cell, and a xenon lamp was used as the light source. Schlieren images of the flame were recorded by a high-speed digital video camera at a frame rate of 600 fps and stored on a PC.

The burning velocity (Su (cm/s)) is expressed by the volume of unburned gas consumed by the flame surface of a unit area per unit time and is calculated by using the following formula.

$$Su = Sb * \rho u / \rho b$$

Sb: flame propagation rate (cm/s)

$\rho u$: adiabatic flame temperature (unburned)

$\rho b$: adiabatic flame temperature (burned)

Sb was determined from the schlieren video images, $\rho u$ was calculated from a measurement temperature, $\rho b$ was calculated from the combustion heat and isobaric specific heat of combustion gas.

Table 2 shows the results.

TABLE 2

| Item | | | Com Ex1 | Com Ex2 | Com Ex3 | Example1 | Example2 |
|---|---|---|---|---|---|---|---|
| WCF | HFO-1132E | mass % | R404A | 20.0 | 30.0 | 35.3 | 38.4 |
| | R1234ze | mass % | | 80.0 | 70.0 | 64.7 | 61.6 |
| WCFF | HFO-1132E | mass % | | 53.4 | 65.0 | 68.8 | 72.0 |
| | R1234ze | mass % | | 46.6 | 35.0 | 31.2 | 28.0 |
| GWP | | | 3922 | 5 | 5 | 4 | 4 |
| WCF Burning Velocity | | cm/s | 0.0 | 5 or less | 5 or less | 5 or less | 5 or less |
| WCFF Burning Velocity | | cm/s | 0.0 | 5 or less | 7.8 | 8.9 | 10 |
| ASHRAE Flammability Classification | | | Class 1 | Class 2L | Class 2L | Class 2L | Class 2L |

| Item | | | Example3 | Example4 | Example5 | Example6 | Example7 |
|---|---|---|---|---|---|---|---|
| WCF | HFO-1132E | mass % | 40.0 | 50.0 | 60.0 | 70.0 | 72.0 |
| | R1234ze | mass % | 60.0 | 50.0 | 40.0 | 30.0 | 28.0 |
| WCFF | HFO-1132E | mass % | 73.1 | 68.8 | 84.6 | 89.1 | 68.8 |
| | R1234ze | mass % | 26.9 | 31.2 | 15.4 | 10.9 | 31.2 |
| GWP | | | 4 | 4 | 3 | 3 | 2 |

TABLE 2-continued

| | | | | | | |
|---|---|---|---|---|---|---|
| WCF Burning Velocity | cm/s | 5 or less | 5 or less | 6.5 | 9.3 | 10 |
| WCFF Burning Velocity | cm/s | 10.3 | 12 | 14 | 16 | 16.5 |
| ASHRAE Flammability Classification | | Class 2L | Class 2L | Class 2L | Class 2L | Class 2L |

Subsequently, the performance was evaluated while the evaporating temperature was changed. Table 3 shows the results.

GWP of 4 or less and a refrigerating capacity of 70% or more relative to R404A at an evaporating temperature of −60° C. or more.

TABLE 3

| Item | | Com Ex1-4 | Example8-4 | Example9-4 | Com Ex1-6 | Example8-6 |
|---|---|---|---|---|---|---|
| HFO-1132E | mass % | R404A | 37.0 | 58.0 | R404A | 37.0 |
| R1234ze | mass % | | 63.0 | 42.0 | | 63.0 |
| COPc Ratio | % (relative to R404A) | 100 | 116 | 115 | 100 | 112 |
| Refrigerating Capacity Ratio | % (relative to R404A) | 100 | 61 | 96 | 100 | 70 |
| Discharge Pressure | Mpa | 1.822 | 1.456 | 1.797 | 1.822 | 1.456 |
| Evaporation Pressure | Mpa | 0.014 | 0.006 | 0.010 | 0.048 | 0.026 |
| Compression Ratio | — | 134.6 | 242.6 | 182.0 | 37.9 | 56.9 |
| Evaporating Temperature | ° C. | | −80.0 | | | −60.0 |

| Item | | Example9-6 | Com Ex1-1 | Example8-1 | Example9-1 |
|---|---|---|---|---|---|
| HFO-1132E | mass % | 58.0 | R404A | 37.0 | 58.0 |
| R1234ze | mass % | 42.0 | | 63.0 | 42.0 |
| COPc Ratio | % (relative to R404A) | 111 | 100 | 111 | 109 |
| Refrigerating Capacity Ratio | % (relative to R404A) | 99 | 100 | 73 | 101 |
| Discharge Pressure | Mpa | 1.797 | 1.822 | 1.456 | 1.797 |
| Evaporation Pressure | Mpa | 0.038 | 0.082 | 0.047 | 0.068 |
| Compression Ratio | — | 46.9 | 22.2 | 31.1 | 26.6 |
| Evaporating Temperature | ° C. | −60.0 | | −50.0 | |

| Item | | Com Ex1-2 | Example8-7 | Example9-2 | Com Ex1-3 | Example8-3 |
|---|---|---|---|---|---|---|
| HFO-1132E | mass % | R404A | 37.0 | 58.0 | R4D4A | 37.0 |
| R1234ze | mass % | | 63.0 | 42.0 | | 63.0 |
| COPc Ratio | % (relative to R404A) | 100 | 109 | 107 | 100 | 106 |
| Refrigerating Capacity Ratio | % (relative to R404A) | 100 | 78 | 102 | 100 | 83 |
| Discharge Pressure | Mpa | 1.822 | 1.456 | 1.797 | 1.822 | 1.456 |
| Evaporation Pressure | Mpa | 0.165 | 0.103 | 0.143 | 0.434 | 0.302 |
| Compression Ratio | — | 11.0 | 14.1 | 12.6 | 4.2 | 4.8 |
| Evaporating Temperature | ° C. | | −35.0 | | | −10.0 |

| Item | | Example9-3 | Com Ex1-7 | Example8-7 | Example9-7 |
|---|---|---|---|---|---|
| HFO-1132E | mass % | 58.0 | R404A | 37.0 | 58.0 |
| R1234ze | mass % | 42.0 | | 63.0 | 42.0 |
| COPc Ratio | % (relative to R404A) | 104 | 100 | 105 | 102 |
| Refrigerating Capacity Ratio | % (relative to R404A) | 103 | 100 | 86 | 103 |
| Discharge Pressure | Mpa | 1.797 | 1.822 | 1.456 | 1.797 |
| Evaporation Pressure | Mpa | 0.396 | 0.706 | 0.517 | 0.663 |
| Compression Ratio | — | 4.5 | 2.6 | 2.8 | 2.7 |
| Evaporating Temperature | ° C. | −10.0 | | 5.0 | |

| Item | | Com Ex1-5 | Example8-5 | Example9-5 |
|---|---|---|---|---|
| HFO-1132E | mass % | R404A | 37.0 | 58.0 |
| R1234ze | mass % | | 63.0 | 42.0 |
| COPc Ratio | % (relative to R404A) | 100 | 105 | 102 |
| Refrigerating Capacity Ratio | % (relative to R404A) | 100 | 86 | 103 |
| Discharge Pressure | Mpa | 1.822 | 1.456 | 1.797 |
| Evaporation Pressure | Mpa | 0.820 | 0.610 | 0.777 |
| Compression Ratio | — | 2.2 | 2.4 | 2.3 |
| Evaporating Temperature | ° C. | | 10.0 | |

These results indicate that when the mixed refrigerant according to the present disclosure contains HFO-1132(E) in an amount of 35.3 to 72.0 mass %, and R1234ze in an amount of 64.7 to 28.0 mass %, based on the total amount, of HFO-1132(E) and R1234ze, the refrigerant is classified under the category of WCF lower flammability, and has a The results also indicate that in this case, when used in operating a refrigeration cycle having an evaporating temperature of 5° C. or less, the refrigerant according to the present disclosure has a compression ratio of 2.5 or more.

Additionally, the results also Indicate that in this case, when used in operating a refrigeration cycle having an evaporating temperature of −60° C. or more, the mixed refrigerant has an evaporation pressure of 0.02 MPa or more.

Additionally, When the mixed refrigerant contains HFO-1132(E) in an amount of 35.3 to 38.4 mass %, and R1234ze in an amount of 64.7 to 61.6 mass %, based on the total amount of HFO-1132(E) and R1234ze, the mixed refrigerant falls under the category of ASHRAE lower flammability, and has a GWP of 4 or less and, a refrigerating capacity of 70% or more relative to R404A.

The compositions shown in Table 4 were also evaluated in the same manner as above.

TABLE 4

| Item | | Com Ex5 | Com Ex6 | Example10 | Example11 | Example1-2 |
|---|---|---|---|---|---|---|
| HFO-1132E | mass % | R134a | 10.0 | 14.1 | 22.7 | 35.3 |
| R1234ze | mass % | | 90.0 | 85.9 | 77.3 | 64.7 |
| COPc Ratio | % (relative to R134a) | 100.0 | 98.5 | 98.0 | 97.3 | 95.9 |
| Refrigerating Capacity Ratio | % (relative to R134a) | 100.0 | 91.8 | 100.0 | 114.4 | 135.7 |
| Boiling Point | ° C. | −26.1 | −32.5 | −35.9 | −40.0 | −44.0 |
| Discharge Pressure | Mpa | 1.160 | 1.113 | 1.211 | 1.375 | 1.617 |
| Evaporation Pressure | Mpa | 0.201 | 0.184 | 0.203 | 0.237 | 0.292 |
| Compression Ratio | — | 5.8 | 6.0 | 6.0 | 5.8 | 5.5 |
| ASHRAE Flammability Classification | | Class 1 | Class 2L | Class 2L | Class 2L | Class 2L |
| Evaporating Temperature | ° C. | | | −40° C. | | |

| Item | | Example8-6 | Example2-1 | Com Ex3-1 | Com Ex4-1 |
|---|---|---|---|---|---|
| HFO-1132E | mass % | 37.0 | 38.4 | 40.0 | 50.0 |
| R1234ze | mass % | 63.0 | 61.6 | 60.0 | 50.0 |
| COPc Ratio | % (relative to R134a) | 95.7 | 95.5 | 95.3 | 94.0 |
| Refrigerating Capacity Ratio | % (relative to R134a) | 138.4 | 140.7 | 143.3 | 158.9 |
| Boiling Point | ° C. | −44.5 | −44.8 | −45.2 | −47.1 |
| Discharge Pressure | Mpa | 1.648 | 1.674 | 1.704 | 1.887 |
| Evaporation Pressure | Mpa | 0.299 | 0.306 | 0.313 | 0.358 |
| Compression Ratio | — | 5.5 | 5.5 | 5.5 | 5.3 |
| ASHRAE Flammability Classification | | Class 2L | Class 2L | Class 2 | Class 2 |
| Evaporating Temperature | ° C. | | −40° C. | | |

The results of Table 4 indicate that when containing HFO-1132E in an amount, of 14.1% or more, these mixed refrigerants have a refrigerating capacity equivalent to that of R134a. The results of Table 4 also indicate that when containing HFO-1132E in an amount of 22.7% or more, these mixed refrigerants have a boiling point of −40° C. or less, and that when containing HFO-1132E in an amount of 35.3% or more, these mixed refrigerants have a boiling point of −44° C. or less. Additionally, the results of Table 4 indicate that when containing HFO-1132E in an amount of 33.4% or less, these mixed refrigerants fall under the category of ASHRAE 2L or below. These results suggest that the higher the concentration of HFO-1132E within the range of 14.1% to 38.4%, the more promising the mixed refrigerant is as an alternative refrigerant for R134a.

DESCRIPTION OF THE REFERENCE NUMERALS

1: Sample cell
2: High-speed camera
3: Xenon lamp
4: Collimating lens
5: Collimating lens
6: Ring

The invention claimed is:

1. A composition comprising a refrigerant, the refrigerant comprising trans-1,2-difluoroethylene (HFO-1132(E)) and 1,3,3,3-tetrafluoropropene (R1234ze),
   wherein the refrigerant contains HFO-1132(E) in an amount of 35.3 to 38.4 mass %, and R1234ze in an amount of 64.7 to 61.6 mass %, based on the total amount of HFO-1132(E) and R1234ze.

2. The composition according to claim 1, which is for use as a working fluid for a refrigerating machine, the composition further comprising a refrigeration oil.

3. The composition according to claim 1, which is for use in operating a refrigeration cycle having an evaporating temperature of −60 to 5° C.

4. The composition according to claim 1, which is for use as an alternative refrigerant for R404A.

5. A refrigerating machine comprising the composition of claim 1 as a working fluid.

6. The refrigerating machine according to claim 5, comprising a refrigeration cycle having an evaporating temperature of −60 to 5° C.

7. A method for operating a refrigerating machine, comprising circulating the composition of claim 1 as a working fluid in a refrigerating machine.

8. The method according to claim 7, wherein the refrigerating machine comprises a refrigeration cycle having an evaporating temperature of −60 to 5° C.

9. A composition comprising a refrigerant, the refrigerant comprising HFO-1132(E) and R1234ze, which is for use as an alternative refrigerant for at least one refrigerant selected from the group consisting of R134a, 2,3,3,3-tetrafluoropropene (R1234yf), and $CO_2$ (R744),
   wherein the refrigerant contains HFO-1132(E) in an amount of 14.1 to 38.4 mass %, and R1234ze in an amount of 85.9 to 61.6 mass %, based on the total amount of HFO-1132(E) and R1234ze, and contains HFO-1132(E) and R1234ze in a total amount of 99.5 mass % or more, based on the entire refrigerant.

10. The composition according to claim 9, which is for use as an alternative refrigerant for R134a.

11. The composition according to claim 9, which is for use as a working fluid for a refrigerating machine, the composition further comprising a refrigeration oil.

12. The composition according to claim 9, which is for use as a working fluid in an air-conditioning system, a refrigerator, a freezer, a water cooler, an ice maker, a refrigerating showcase, a freezing showcase, a freezing and refrigerating unit, a refrigerating machine for freezing and refrigerating warehouses, an air-conditioning system for vehicles, a turbo refrigerating machine, or a screw refrigerating machine.

13. The composition according to claim 9, which is for use as a working fluid in an air-conditioning system for vehicles.

14. A refrigerating machine comprising the composition of claim 9 as a working fluid.

15. The refrigerating machine according to claim 14, which is an air-conditioning system, a refrigerator, a freezer, a water cooler, an ice maker, a refrigerating showcase, a freezing showcase, a freezing and refrigerating unit, a refrigerating machine for freezing and refrigerating warehouses, an air-conditioning system for vehicles, a turbo refrigerating machine, or a screw refrigerating machine.

16. The refrigerating machine according to claim 14, which is an air-conditioning system for vehicles.

17. A method for operating a refrigerating machine, comprising circulating the composition of claim 9 as a working fluid in a refrigerating machine.

18. The method according to claim 17, wherein the refrigerating machine is an air-conditioning system, a refrigerator, a freezer, a water cooler, an ice maker, a refrigerating showcase, a freezing showcase, a freezing and refrigerating unit, a refrigerating machine for freezing and refrigerating warehouses, an air-conditioning system for vehicles, a turbo refrigerating machine, or a screw refrigerating machine.

19. The method according to claim 17, wherein the refrigerating machine is an air-conditioning system for vehicles.

20. A composition comprising a refrigerant, the refrigerant comprising HFO-1132(E) and R1234ze, which is for use as an alternative refrigerant for at least one refrigerant selected from the group consisting of R134a, R1234yf, and $CO_2$,
wherein the refrigerant contains HFO-1132(E) in an amount of 22.7 to 38.4 mass %, and R1234ze in an amount of 77.3 to 61.6 mass %, based on the total amount of HFO-1132(E) and R1234ze, and contains HFO-1132(E) and R1234ze in a total amount of 99.5 mass % or more, based on the entire refrigerant.

21. A composition comprising a refrigerant, the refrigerant comprising HFO-1132(E) and R1234ze, which is for use as an alternative refrigerant for at least one refrigerant selected from the group consisting of R134a, R1234yf, and $CO_2$, wherein the refrigerant contains HFO-1132(E) in an amount of 35.3 to 38.4 mass %, and R1234ze in an amount of 64.7 to 61.6 mass %, based on the total amount of HFO-1132(E) and R1234ze.

* * * * *